(12) United States Patent
Lai

(10) Patent No.: US 7,046,316 B2
(45) Date of Patent: May 16, 2006

(54) LIQUID CRYSTAL DISPLAY DEVICE AND BACKLIGHT MODULE THEREOF

(75) Inventor: Ching Kun Lai, Changhua (TW)

(73) Assignee: Hannstar Display Corp., Taipei (TW)

( * ) Notice: Subject to any disclaimer, the term of this patent is extended or adjusted under 35 U.S.C. 154(b) by 121 days.

(21) Appl. No.: 10/713,001

(22) Filed: Nov. 17, 2003

(65) Prior Publication Data
US 2004/0179150 A1    Sep. 16, 2004

(30) Foreign Application Priority Data
Mar. 13, 2003   (TW) ............................... 92204025 U

(51) Int. Cl.
*G02F 1/1333*  (2006.01)
*H01J 15/00*   (2006.01)

(52) U.S. Cl. .............................. 349/58; 349/59; 174/50

(58) Field of Classification Search .................. 174/50; 349/58, 59, 60
See application file for complete search history.

(56) References Cited

U.S. PATENT DOCUMENTS 6,339,457 B1 *  1/2002   Won ............................. 349/58
6,392,723 B1 *  5/2002   Sugiyama et al. ............ 349/58

* cited by examiner

*Primary Examiner*—Andrew Schechter
*Assistant Examiner*—Mike Qi

(57) ABSTRACT

A liquid crystal display device includes a housing, a backlight module, a liquid crystal panel and a frame. The frame is coupled to the housing thereby assembling the liquid crystal panel and the backlight module into the liquid crystal display device. There is a fastening structure for coupling the frame to the housing. The fastening structure includes an engaging portion provided on the housing and two protrusion portions defined by a L-shaped aperture provided on the frame, wherein the engaging portion is provided at a position corresponding to the L-shaped aperture. The two protrusion portions of the frame are respectively inserted into recesses of the engaging portion of the housing and abut against the engaging portion.

20 Claims, 10 Drawing Sheets

LIQUID CRYSTAL DISPLAY DEVICE AND BACKLIGHT MODULE THEREOF

BACKGROUND OF THE INVENTION

1. Field of the Invention

The present invention relates to a liquid crystal display device, more particularly to a fastening structure of the liquid crystal display device which allows a liquid crystal panel and a back light module to be firmly assembled by engaging a housing with a frame through the fastening structure.

2. Description of the Related Art

Generally, as shown in FIG. 1, a liquid crystal display device 100 mainly includes a liquid crystal panel 102 and a backlight module 202. The liquid crystal display device includes two printed circuit boards 104 and 106 for transferring controlling and driving signals to the liquid crystal panel 102 through the tape carrier packages 108. The backlight module 202 mainly includes a lamp 204, a reflector 206, a light guide plate 208 and an optical film 210. The backlight module 202 is configured to distribute a light from the lamp 204 uniformly over the surface of the liquid crystal panel 102. The liquid crystal display device 100 further includes a metal frame 302 and a plastic housing 304 coupled to each other thereby assembling the liquid crystal panel 102 and the backlight module into the liquid crystal display device 100.

According to one conventional technique, as shown in FIG. 2, the metal frame 302 and the plastic housing 304 may be assembled by a screw 402. However, this conventional method requires an extra cost for the screw and extra time for aligning and screwing.

According to another conventional technique, as shown in FIG. 3, the plastic housing 304 has a rectangular recess 502 and the metal frame 302 has a protrusion portion 504 being inserted into the rectangular recess 502 of the plastic housing 304 thereby engaging with the plastic housing 304. According to the aforementioned structure, the metal frame 302 can be coupled to the plastic housing 304 without any extra fastener. In view of the coordinates defined in FIG. 3, the housing 304 and the frame 302 can retain their relative position in the Z-axis direction, but the housing 304 and the frame 302 can't retain their relative position in the Y-axis direction since the rectangular recess 502 doesn't have any supporting structure for immobilizing the protrusion portion 504 in Y-axis direction.

SUMMARY OF THE INVENTION

Therefore, it is an object of the present invention to provide a liquid crystal display device characterized by having a novel fastening structure to facilitate assembly of the metal frame and the plastic housing thereby reducing the cost and assembling time.

The liquid crystal display device mainly includes a housing, a backlight module, a liquid crystal panel and a frame. The backlight module is disposed on the housing, and the liquid crystal panel is disposed on the backlight module. The frame is coupled to the housing thereby assembling the liquid crystal panel and the backlight module into the liquid crystal display device.

According to one embodiment of the present invention, the housing has at least one pair of recesses each having a bottom surface, an opening, and a side surface adjacent to the other recess and at an obtuse angle to the bottom surface. The frame has at least one pair of L-shaped apertures. Each L-shaped aperture has a lateral aperture and a longitudinal aperture together defining a protrusion portion, and the L-shaped apertures are symmetric to each other thereby defining a pair of protrusion portions symmetric to each other. When the frame and the housing are assembled, the pair of protrusion portions of the frame are respectively bent and then inserted into the pair of recesses of the housing and substantially abut against the bottom surfaces of the recesses and the side surfaces of the recesses that are at an obtuse angle to the bottom surfaces.

According to another embodiment of the present invention, the frame has a plurality of L-shaped apertures each having a lateral aperture and a longitudinal aperture together defining a hooked protrusion portion. The hooked protrusion portion has an arm and a hook terminal, wherein the arm connects with the frame. The housing has a plurality of engaging portions. The engaging portion could be a recess including a first portion and a second portion. The drop between the bottom surface of the first portion and the backside surface of the housing is smaller than the drop between the bottom surface of the second portion and the backside surface of the housing. When the frame and the housing are assembled, the hooked protrusion of the frame is bent and then inserted into the recess of the housing in a manner that the arm of the hooked protrusion is disposed on the first portion and the hook terminal of the hooked protrusion is inserted into the second portion and abut against the first portion.

Furthermore, according to another embodiment of the present invention, which applies to the places where a printed circuit board for controlling the backlight module and the liquid crystal panel is located. The printed circuit board is typically disposed in the housing, and the backside of the printed circuit board has a ground terminal exposed from an opening of the housing. The liquid crystal display device further includes a ground metal sheet having a first terminal portion contacting the ground terminal of the printed circuit board and a second terminal portion fixed to the frame so as to achieve grounding.

Other objects, advantages, and novel features of the invention will become more apparent from the following detailed description when taken in conjunction with the accompanying drawings.

DETAILED DESCRIPTION OF THE PREFERRED EMBODIMENT

Embodiment I

Figure 1:
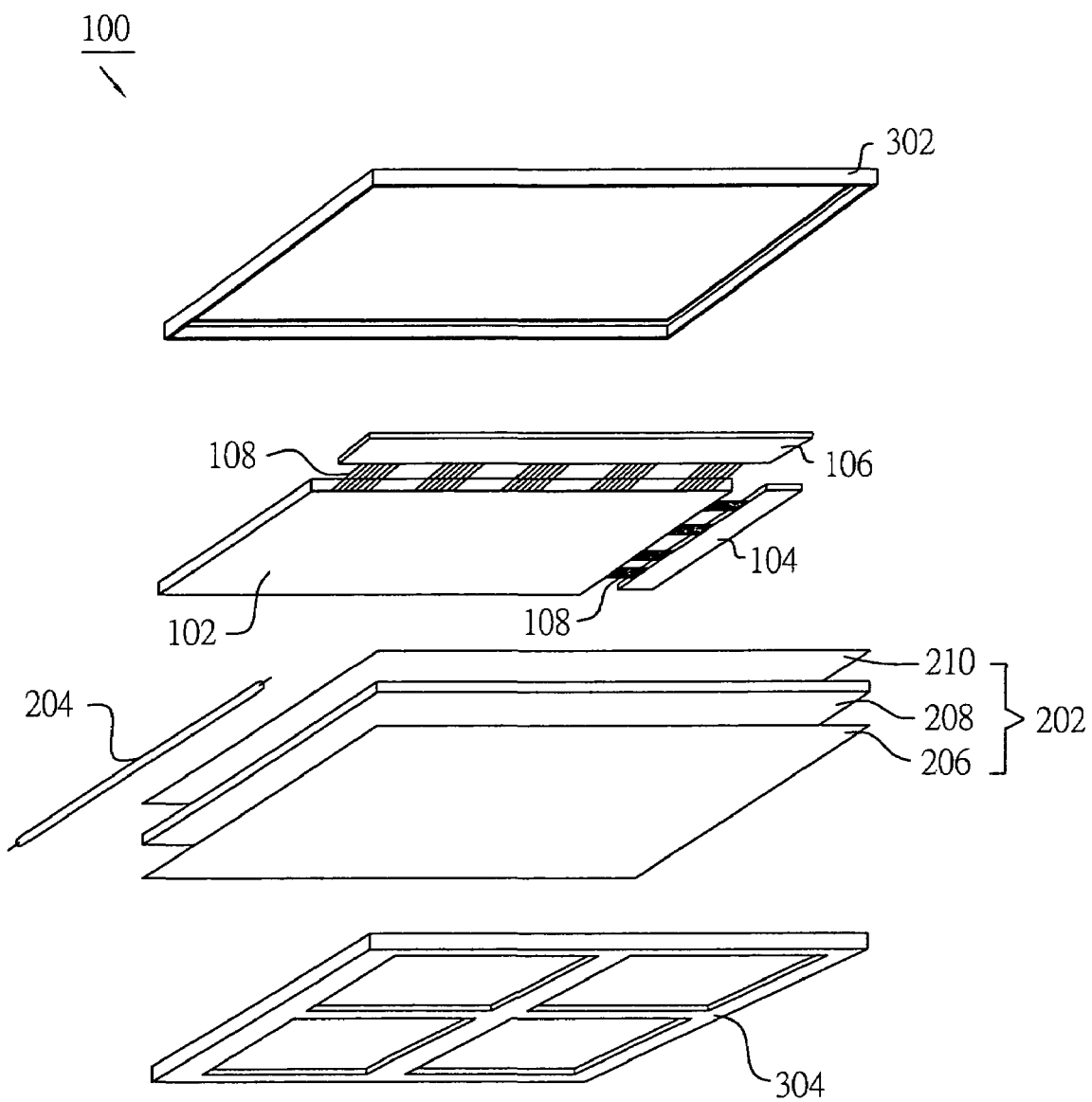
FIG. 1 is an exploded perspective view showing a conventional liquid crystal display device.
Figure 2:
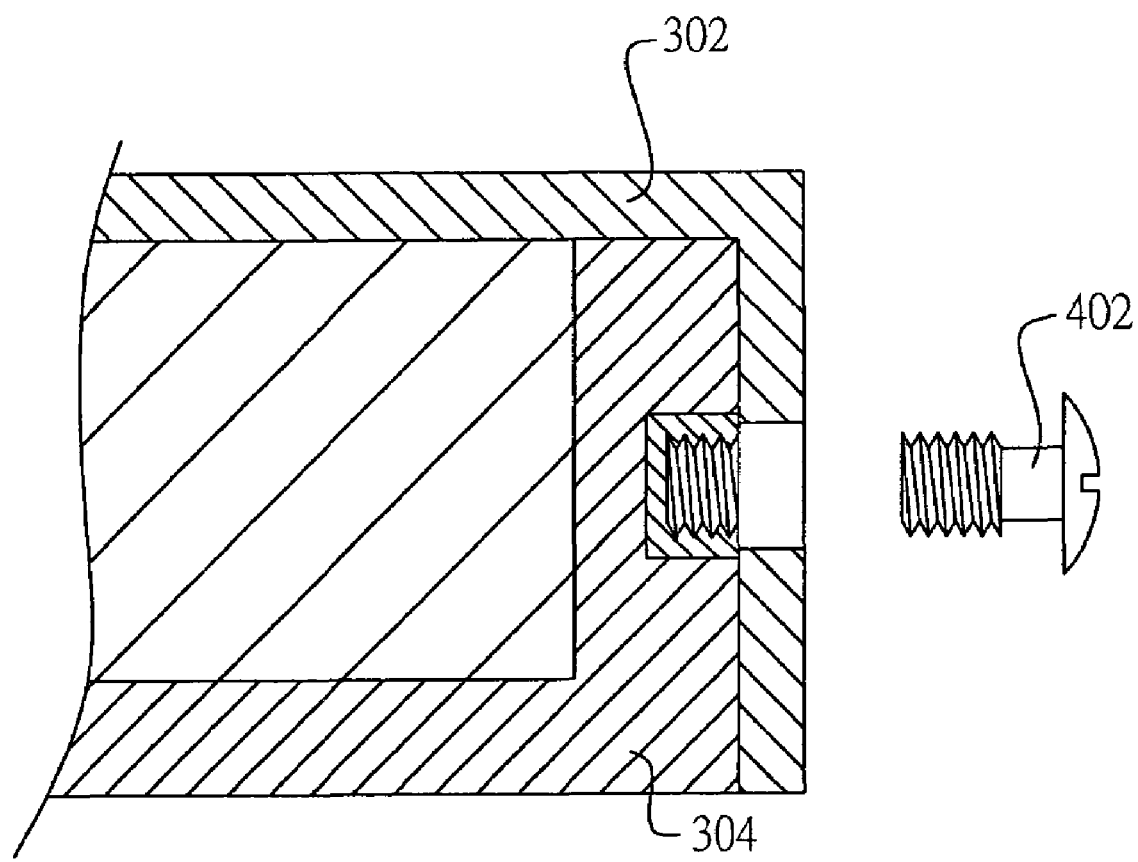
FIG. 2 is a cross-sectional view of a portion of a conventional liquid crystal display device.
Figure 3:
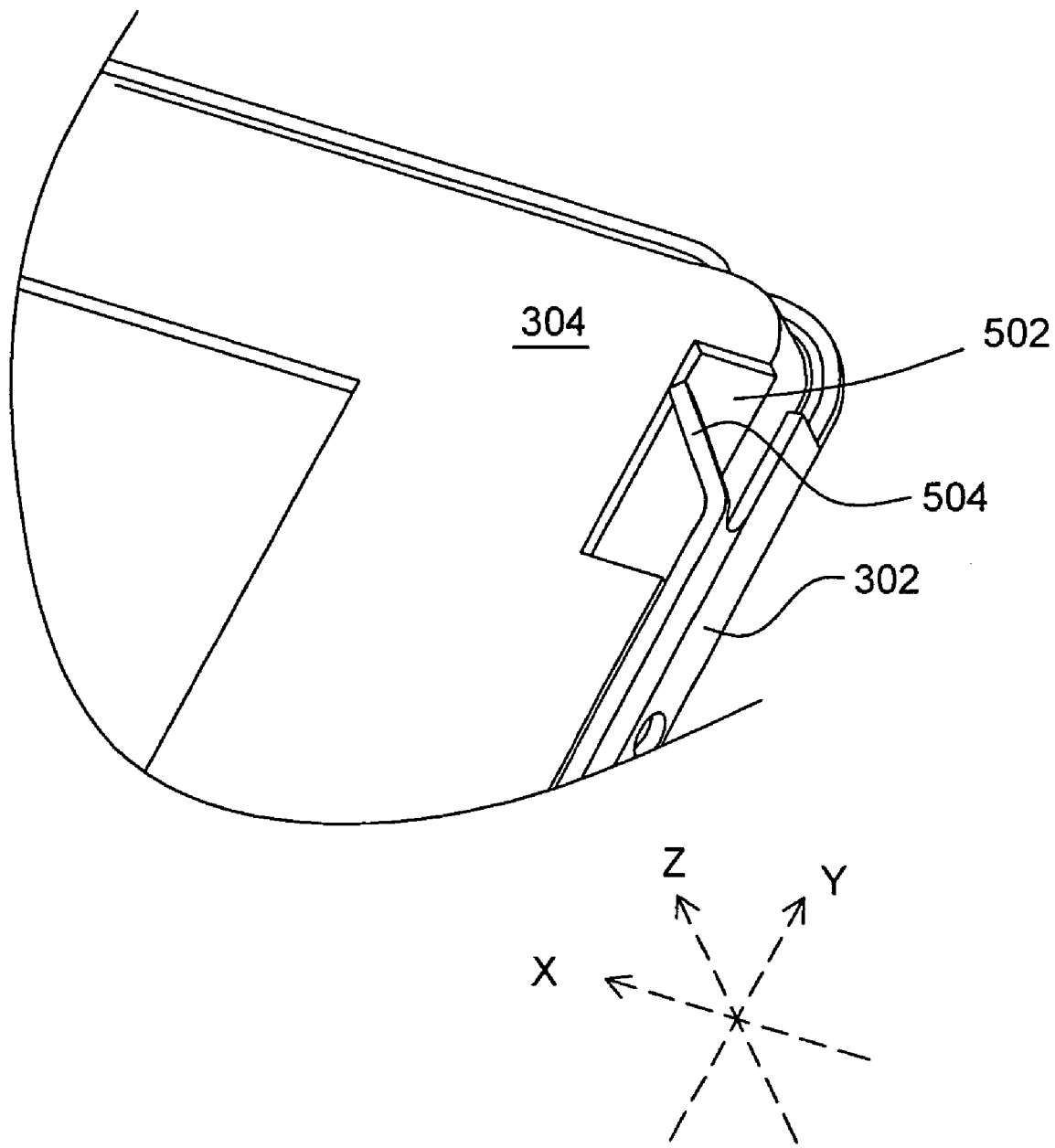
FIG. 3 is an elevation view of a portion of another conventional liquid crystal display device.
Figure 4:
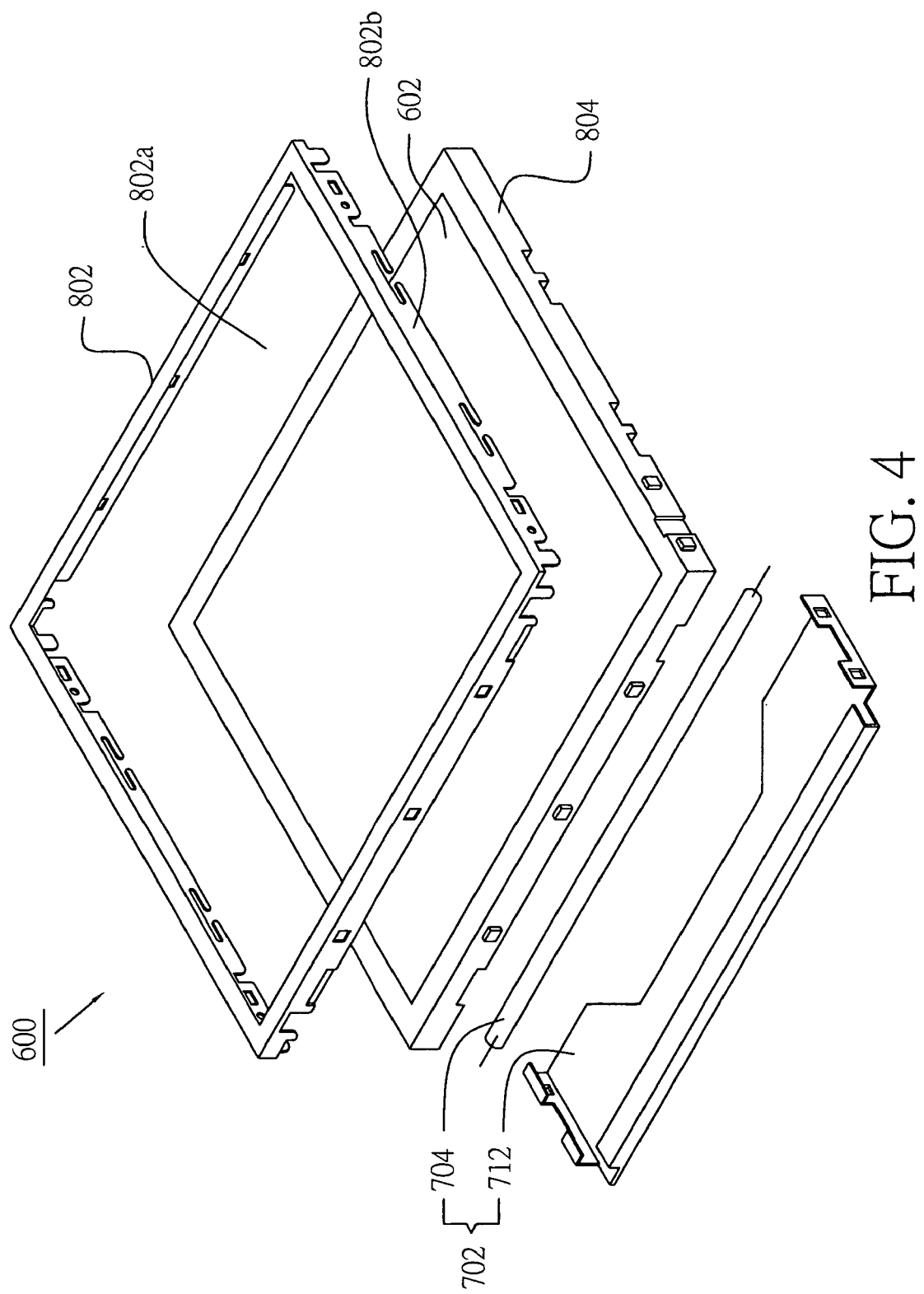
FIG. 4 is an exploded perspective view of a liquid crystal display device according to Embodiment I of the present invention.
Figure 5:
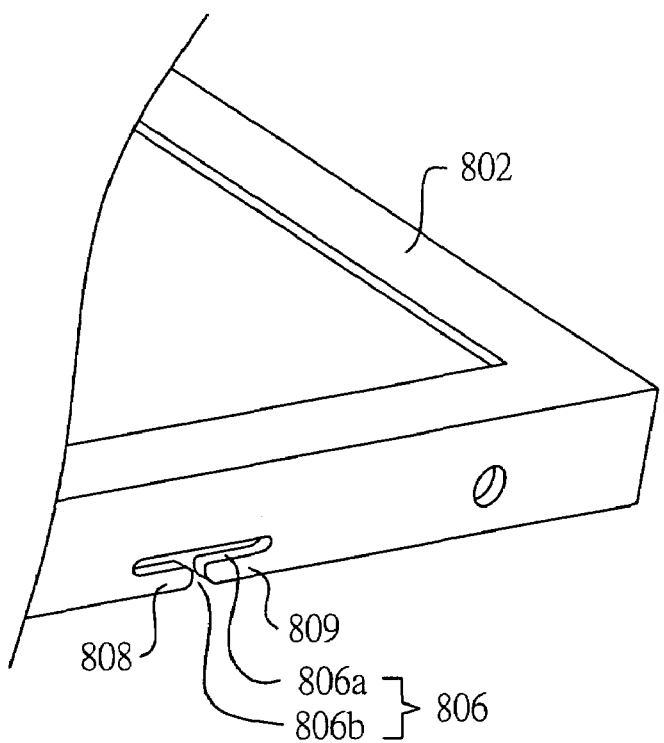
FIG. 5 is an elevation view showing a portion of a frame of the liquid crystal display device of FIG. 4 showing an unbent protrusion.
Figure 6:
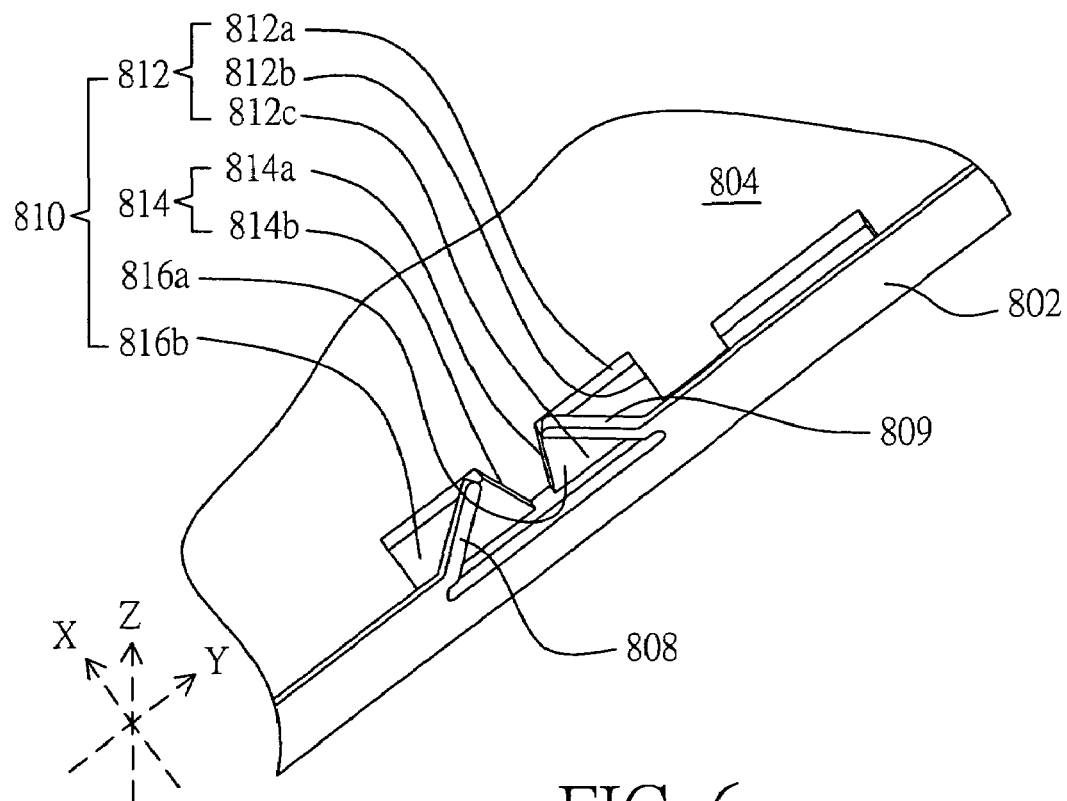
FIG. 6 is a back elevation view of a portion the assembled liquid crystal display device of FIG. 4 to illustrate the assembled portion of the frame and the housing.

FIGS. 4–6 illustrate a liquid crystal display device 600 representing Embodiment I of the present invention. FIG. 4 shows an exploded perspective view of the liquid crystal display device 600. As shown, the liquid crystal display device 600 mainly includes a liquid crystal panel 602 (with a liquid crystal layer interposed between a pair of substrates) for displaying image and a backlight module 702 (denoted with 202 in FIG. 1) for illuminating the liquid crystal panel 602.

The backlight module 702 includes a lamp 704 served as a light source and a lamp holder 712. The backlight module 702 is configured to distribute a light from the lamp 704 uniformly over the surface of the liquid crystal panel 602. More specifically, the lamp 704 is disposed along one edge of the light guide plate and received within the lamp holder 712.

The liquid crystal display device 600 further includes a frame 802 and a housing 804. The housing 804 is typically made of plastics and used for receiving the backlight module 702 and the liquid crystal panel 602. The frame 802 is generally made of metal. The frame 802 has a display window 802a corresponding to the display region of the liquid crystal panel 602 and four sides 802b surrounding the housing 804. The frame 802 is coupled to the housing 804 thereby assembling the liquid crystal panel 602 and the backlight module 702 into the liquid crystal display device 600.

The present invention provides a special fastening structure used for coupling the frame 802 to the housing 804 such that the frame 802 and the housing 804 can retain their relative position when they are subject to a vibration due to an external stress. FIG. 5 illustrates a portion of the frame 802 of the liquid crystal display device 600 of FIG. 4. As shown, the frame 802 has at least one T-shaped aperture 806 having a lateral aperture 806a and a longitudinal aperture 806b together defining two protrusion portions 808 and 809. FIG. 6 illustrate a portion of the assembled liquid crystal display device 600 wherein the protrusion portions 808 and 809 are bent into an engaging portion 810 of the housing 804 after the frame 802 is coupled to the housing 804. The engaging portion 810 is formed at the position corresponding to the T-shaped aperture 806. The engaging portion 810 includes a recess 812 and a trapezoid protrusion area 814. Specifically, the recess 812 includes a bottom surface 812a, a side surfaces 812b and an opening 812c; the trapezoid protrusion area 814 extends from the bottom surface 812a to the opening 812c and divides the recess 812 into two regions 816a and 816b. The trapezoid protrusion area 814 has two slanting sides 814a and 814b each adjacent to one of the two regions 816a and 816b. It is preferred that the protrusion area is a trapezoid protrusion area having parallel first and second sides wherein the first side is close to the bottom surface 812a of the recess 812, and the second side is close to the opening 812c of the recess 812 and shorter than the fist side. It is preferred that the slanting sides 814a and 814b of the protrusion area 814 respectively intersect the bottom surfaces 812a to form an obtuse angel. The two protrusion portions 808 and 809 can be respectively bent into the two regions 816a and 816b of the recess 812 of the engaging portion 810 of the housing 804 and substantially abut against the bottom surface 812a and one of the two slanting sides 814a and 814b of the protrusion area 814. The aforementioned fastening structure can not only fasten the frame 802 to the housing 804 but also make the frame 802 and the housing 804 retain their relative position in Z- axis direction and Y-axis direction given in the coordinates of FIG. 6.

Although only one fastening structure is shown in FIG. 6, it should be understood by those skilled in the art that a liquid crystal display device for use with the invention can include any numbers of aforementioned substrate units if desired. It can be understood that the liquid crystal display device shown in FIG. 6 may be provided with another fastening structure located opposite to the fastening structure shown in FIG. 6 thereby the frame 802 and the housing 804 can retain their relative position in X-axis direction.

Embodiment II

Figure 7:
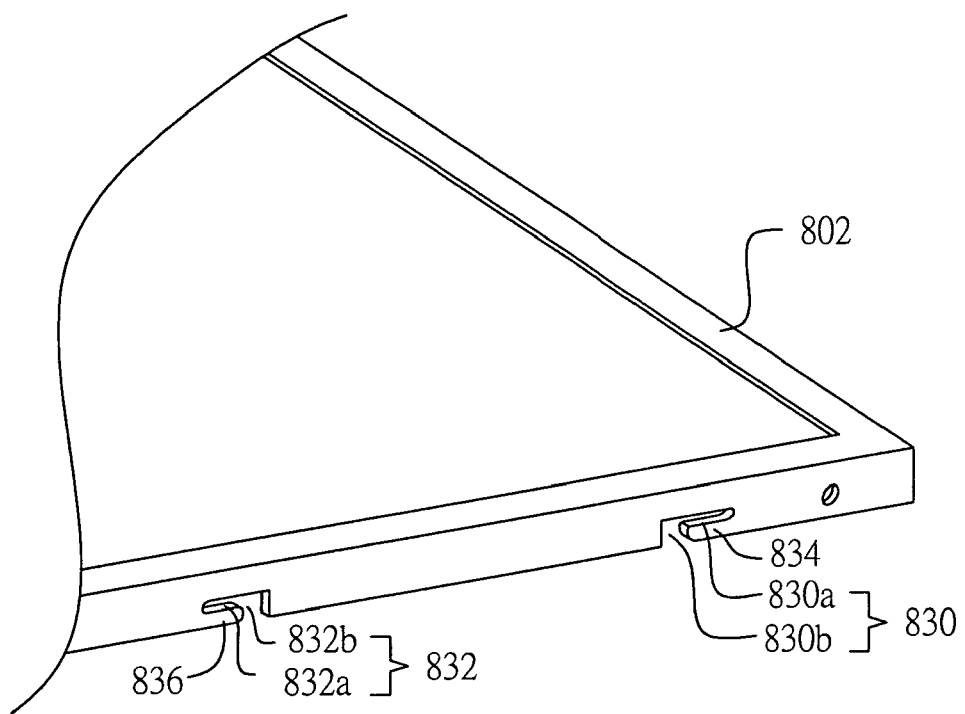
FIG. 7 is an elevation view of a portion of a frame of the liquid crystal display device according to Embodiment II of the present invention showing an unbent protrusion.
Figure 8:
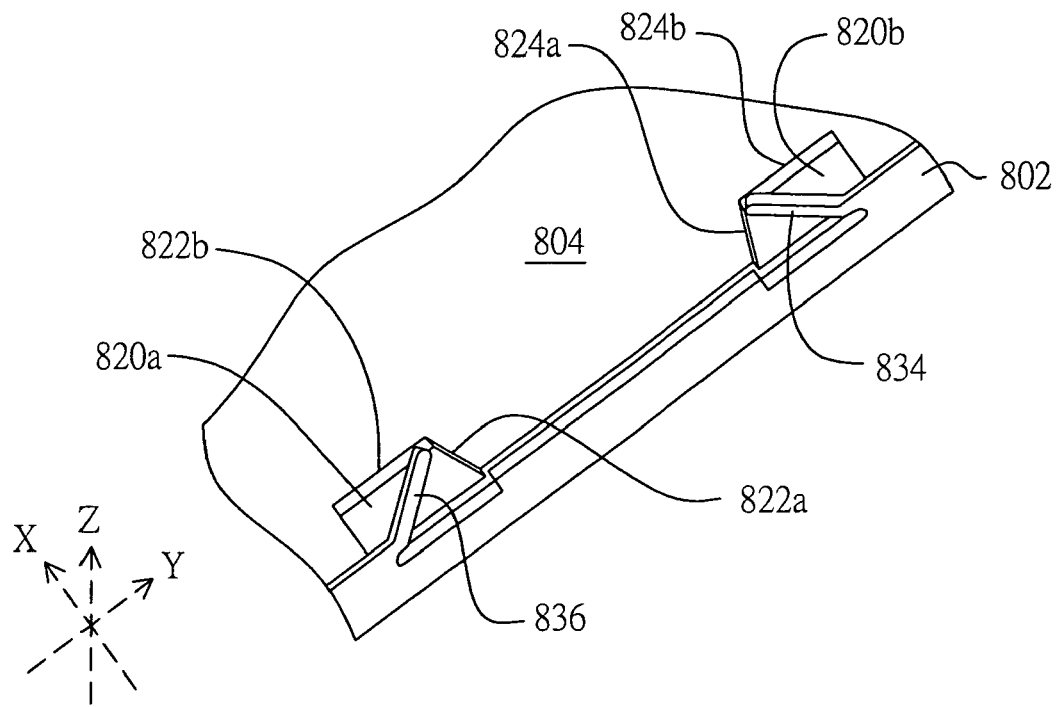
FIG. 8 is a back elevation view of a portion of the assembled liquid crystal display device of FIG. 7 to illustrate the assembled portion of the frame and the housing.

FIGS. 7–8 illustrate a liquid crystal display device representing Embodiment II of the present invention. FIG. 7 illustrates a portion of the frame 802 of Embodiment II. As shown, the frame 802 has a pair of L-shaped apertures 830 and 832. Each of the L-shaped apertures 830 and 832 has a lateral aperture 830a(832a) and a longitudinal aperture 830b(832b) together defining a protrusion portion 834(836). The lateral apertures 830a, 832a and the longitudinal apertures 830b, 832b of the pair of L-shaped apertures 830, 832 are arranged to be symmetric with respect to the middle point between the pair of L-shaped apertures 830 and 832 thereby the protrusion portions 834 and 836 are also symmetric to each other. FIG. 8 illustrate a portion of the assembled liquid crystal display device wherein the protrusion portions 834 and 836 are bent into the recesses 820a and 820b of the housing 804 after the frame 802 is coupled to the housing 804. As shown in FIG. 8, the housing 804 has a pair of recesses 820a and 820b. Each of the recesses 820a and 820b includes a bottom surface, a side surface, a slanting side and an opening. It should be noted that each of the slanting sides 822a and 824a of the two recesses 820a and 820b respectively intersect the bottom surfaces 822b and 824b to form an obtuse angel as shown, the protrusion portions 834 and 836 of the frame 802 are bent into the recesses 820a and 820b of the housing 804 and substantially abut against the bottom surfaces 822b, 824b and side surfaces 822a, 824a of the recesses 820a and 820b, respectively. The aforementioned fastening structure can not only fasten the frame 802 to the housing 804 but also make the frame 802 and the housing 804 retain their relative position in Z- axis direction and Y-axis direction given in the coordinates of FIG. 8.

Although only one fastening structure is shown in FIG. 8, it should be understood by those skilled in the art that a liquid crystal display device for use with the invention can include any numbers of aforementioned substrate units if desired. It can be understood that the liquid crystal display device shown in FIG. 8 may be provided with another fastening structure located opposite to the fastening structure shown in FIG. 8 thereby the frame 802 and the housing 804 can retain their relative position in X-axis direction.

Embodiment III

Figure 9:
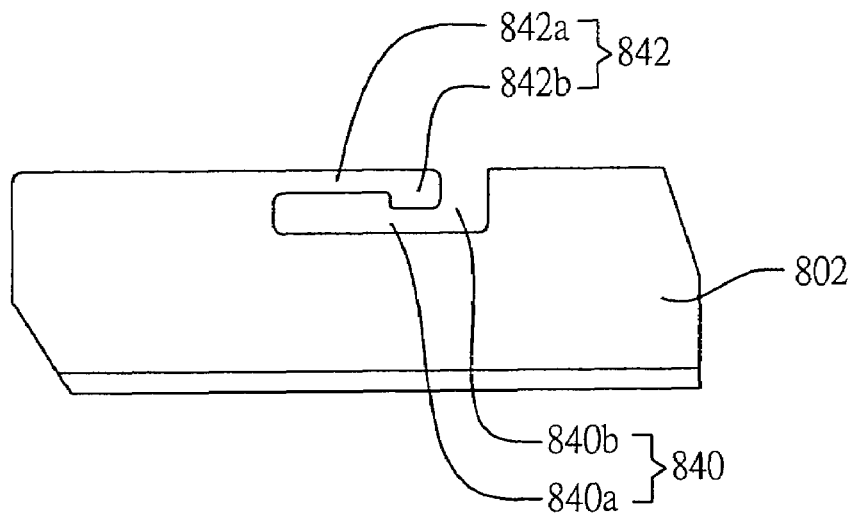
FIG. 9 is an elevation view showing a portion of a frame of the liquid crystal display device according to Embodiment III of the present invention showing an unbent protrusion.
Figure 10:
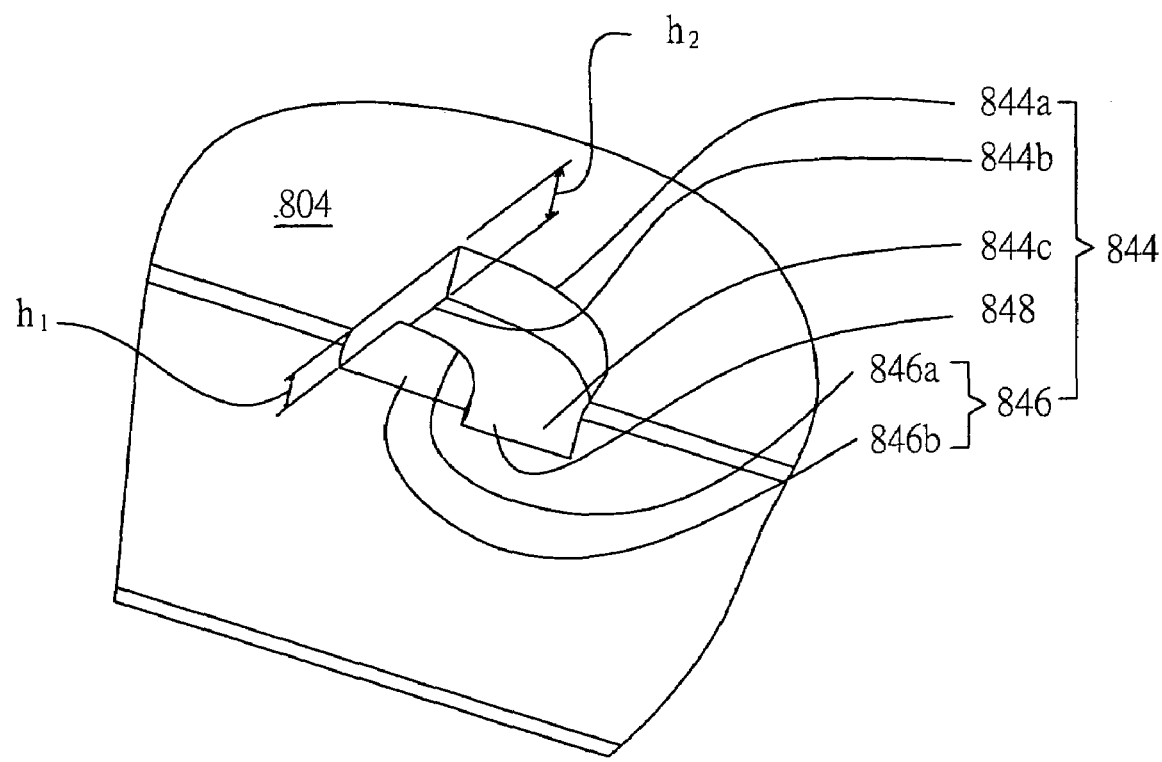
FIG. 10 is a back elevation showing a portion of the housing of the liquid crystal display device in FIG. 9 to illustrate the assembled portion of the housing.
Figure 11:
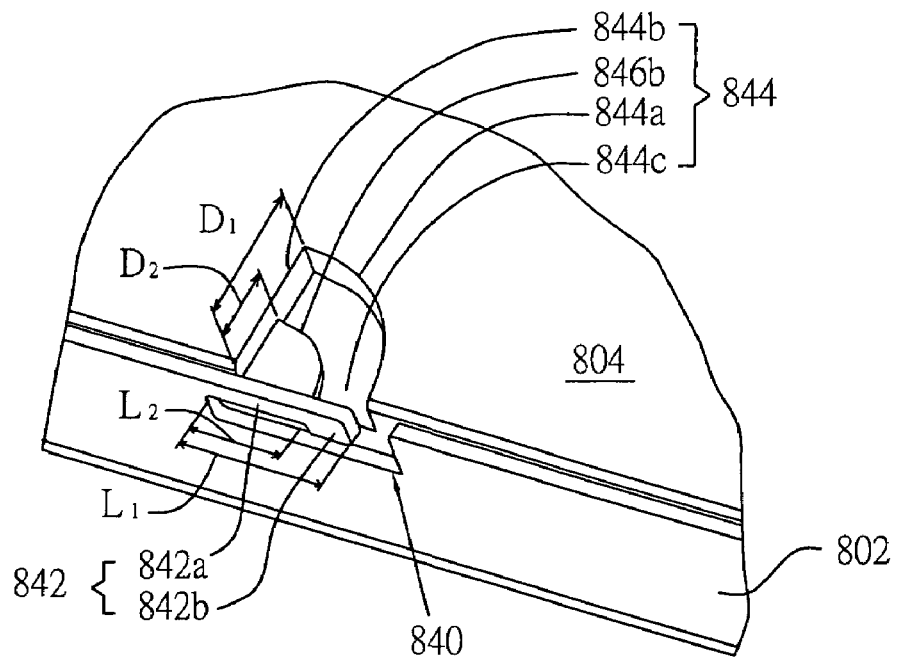
FIG. 11 is a back elevation showing a portion of the assembled liquid crystal display device in FIG. 9 to illustrate the assembled portion of the frame and the housing and an unbent protrusion.

FIGS. 9–11 illustrate a liquid crystal display device representing Embodiment III of the present invention. FIG. 9 illustrates a portion of the frame 802 of the Embodiment III. As shown, the frame (upper frame) 802 has a plurality of L-shaped apertures 840 (only one of them is shown in FIG. 9) each having a lateral aperture 840a and a longitudinal aperture 840b together defining a hooked protrusion portion 842. The hooked protrusion portion 842 has an arm 842a connecting with the frame 802 and a hook terminal 842b. In this embodiment, the hook terminal 842b has a width larger than the width of the arm 842a such that the hook terminal 842b projects from the arm 842a.

FIG. 10 illustrates a portion of the housing 804 of the Embodiment III. As shown, the housing 804 has a plurality of engaging portions 844, which is preferably an arc-shaped recess. The arc-shaped recess 844 has a first portion 846 and a second portion 848. The first drop h1 between the base surface 846b of the first portion 846 and the backside surface of the housing 804 is smaller than the second drop h2 between the base surface of the second portion 848 and the backside surface of the housing 804. Specifically, the arc-shaped recess 844 has a curved side 844a, a straight side 844b and an opening side 844c. Both the curved side 844a and the straight side 844b have one ends extending to the opening side 844c and the other ends joining with each other. In this embodiment, the first portion 846 of the recess 844 is formed between the opening side 844c and the straight side 844b of the recess 844. The first portion 846 has a curved edge 846a substantially parallel with the curved side 844a of the recess 844. The curved edge 846a of the first portion 846 and the curved side 844a of the recess 844 define the second portion 848 such that the second portion 848 become a curved groove.

Figure 12:
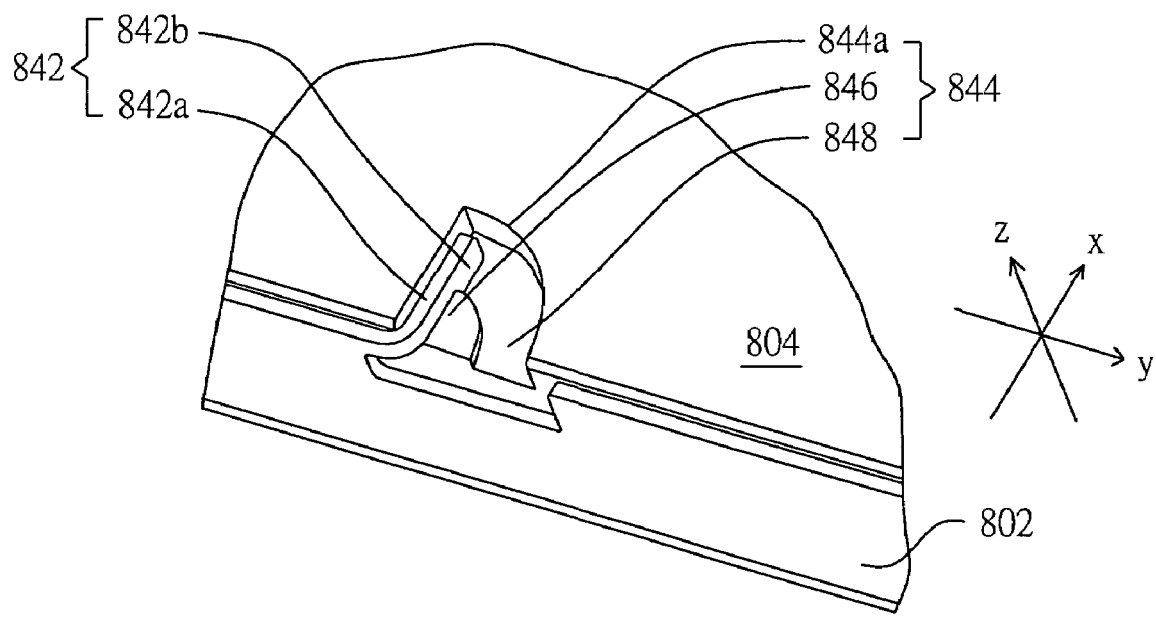
FIG. 12 is a back elevation showing a portion of the assembled liquid crystal display device in FIG. 9 to illustrate the assembled portion of the frame and the housing, wherein the protrusion is bent into an engaging portion of the housing.

When the frame 802 and the housing 804 are assembled as shown in FIG. 11, the L-shaped aperture 840 and the arc-shaped recess 844 are located corresponding to each other. When the hooked protrusion 842 defined by the L-shaped aperture 840 is corresponded to the arc-shaped recess 844 and then bent into the arc-shaped recess 844, as shown in FIG. 12, the hook terminal 842b which project from the arm 842a can be inserted into the arc-shaped recess 844 and the arm 842a is disposed above the first portion 846. After the hooked protrusion 842 is inserted into the arc-shaped recess 844, the hook terminal 842b abuts against the first portion 846 thereby fastening the frame 802 and the housing 804. Reconsidering FIG. 11, it should be noted that the perpendicular distance $D_1$ between the join of the opening side 844c and the straight side 844b of the recess 844 and the curved side 844a of the recess should be bigger than the length $L_1$ of the hooked protrusion portion 842 thereby allowing the hooked protrusion portion 842 to be inserted into the arc-shaped recess 844. It is preferred that the hook terminal 842b of the hooked protrusion portion 842 can abut against the curved edge 846b of the first portion 846 (refer to FIG. 10); therefore, the perpendicular distance $D_2$ between the join of the opening side 844c and the straight side 844b of the arc-shaped recess 844 and the curved edge 846b of the first portion 846 (refer to FIG. 10) should be substantially equal to the length $L_2$ of the arm 842a. In view of the coordinates in FIG. 12, the fastening structures provided in this embodiment retain the relative position of the frame 802 and the housing 804 in Z-axis direction, and the first portion 846 can support the hook terminal 842b in X-axis direction thereby the frame 802 and the housing 804 can retain their relative position in X-axis direction.

Although only one fastening structure is shown in FIG. 12, it should be understood by those skilled in the art that a liquid crystal display device for use with the invention can include any numbers of aforementioned substrate units if desired. It can be understood that the liquid crystal display device shown in FIG. 12 may be provided with another fastening structure located opposite to the fastening structure shown in FIG. 12 thereby the frame 802 and the housing 804 can retain their relative position in Y-axis direction.

Embodiment IV

Figure 13:
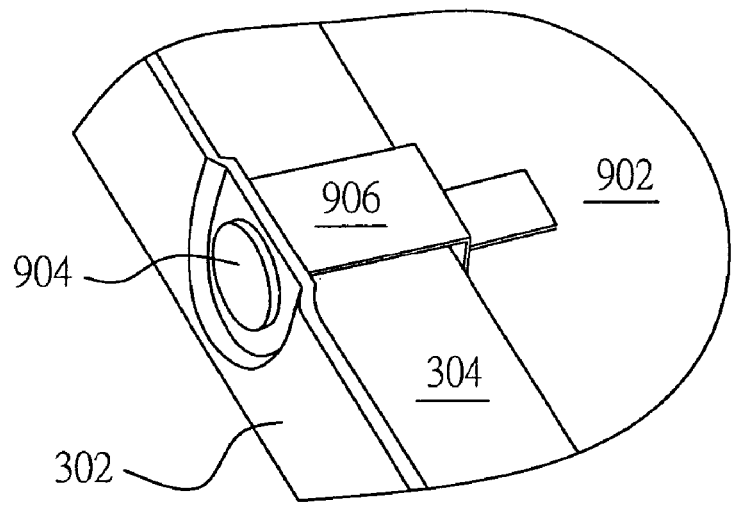
FIG. 13 is an elevation view of a portion of another conventional liquid crystal display device.

Furthermore, the liquid crystal display device generally has a printed circuit board for controlling the backlight module and the liquid crystal panel. As shown in FIG. 13, the printed circuit board 902 is usually disposed in the housing 304, and the backside of the printed circuit board 902 has a ground terminal exposed from an opening of the housing 304. The liquid crystal display device further includes a ground metal sheet 906 having one terminal portion contacting the ground terminal of the printed circuit board 902 and the other terminal portion fixed to the frame 302 by a screw 904 so as to achieve grounding.

Figure 14:
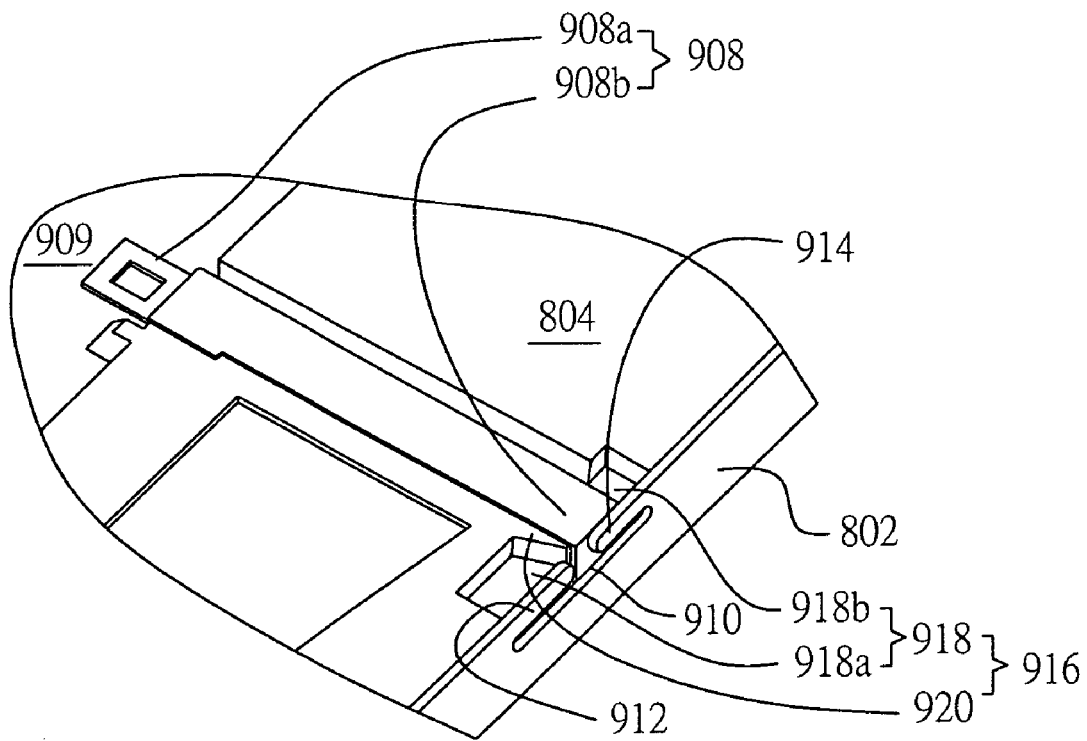
FIG. 14 is a back elevation view of a portion of the assembled liquid crystal display device according to Embodiment IV of the present invention illustrating the assembled portion of the frame and the housing and an unbent protrusion.
Figure 15:
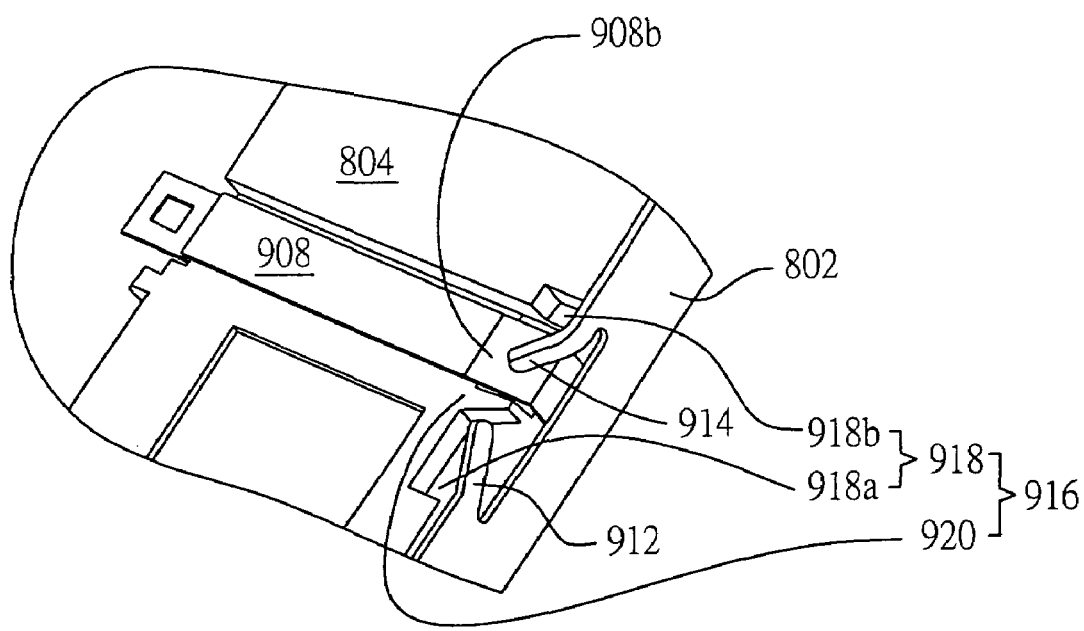
FIG. 15 is a back elevation view of a portion of the assembled liquid crystal display device in FIG. 14 to illustrate the assembled portion of the frame and the housing, wherein the protrusion is bent into an engaging portion of the housing.

FIGS. 14–15 illustrate a liquid crystal display device according to the Embodiment IV of the present invention. In embodiment IV, the present invention provides a structure for fastening the ground metal sheet 908 to the frame 802 so as to achieve grounding. FIG. 14 illustrates the liquid crystal display device before the frame 802 is coupled to the housing 804, the frame 802 has two protrusion portions 912 and 914 defined by a T-shaped aperture 910 thereof as the protrusion portions of Embodiment I. Furthermore, the housing 804 has an engaging portion 916 at the position corresponding to the T-shaped aperture 910 of the frame 802. The engaging portion 916 includes a recess 918 and a protrusion area 920 dividing the recess 918 into a first region 918a for receiving the protrusion portion 912 after bending it (refer to FIG. 15) and a second region 918b. The ground metal sheet 908 is disposed on the backside surface of the housing 804. The liquid crystal display device has a printed circuit board 909 disposed in the housing 804 and exposed from an opening of the housing 804. The ground metal sheet 908 has a first terminal portion 908a contacting the ground terminal of the printed circuit board 909 and a second terminal portion 908b disposed above the protrusion area 920 and the second region 918b of the recess. FIG. 15 illustrates a portion of the assembled liquid crystal display device in Embodiment IV, wherein the protrusion portion 914 of the frame 802 is inserted into the second region 918b of the recess 918 and abuts against the second terminal portion 908b of the ground metal sheet 908 such that the metal sheet 908 is pressed by bending the protrusion portion 914, which exerts an elastic restoring force that causes the metal sheet to tightly contact the protrusion portion 914. The protrusion portion 914 of the frame 802 abuts against the second terminal portion 908b of the ground metal sheet 908 thereby fastening the frame 802 to the housing 804 and electrically connecting the ground terminal of the printed circuit board 909 to the frame 802 through the ground metal sheet 908.

Embodiment V

Figure 16:
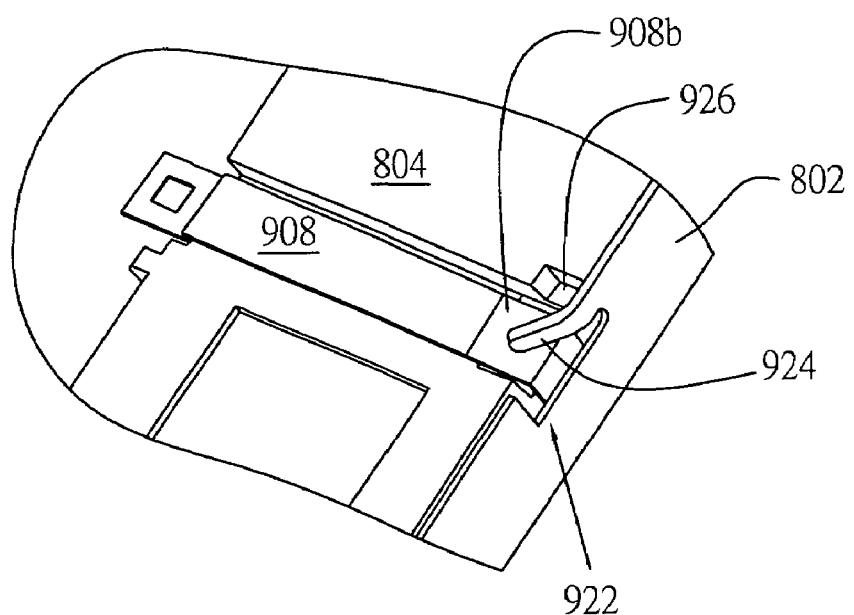
FIG. 16 is a back elevation view of a portion of the assembled liquid crystal display device according to Embodiment V of the present invention illustrating the assembled portion of the frame and the housing, wherein the protrusion is bent into an engaging portion of the housing.

FIG. 16 illustrates Embodiment V of the present invention. In Embodiment V, the frame 802 has a protrusion portion 924 defined by a L-shaped aperture 922 as one protrusion portion of Embodiment II. The housing 804 has a recess 926 formed at the position corresponding to the L-shaped aperture 922. The second terminal portion 908b of the ground metal sheet 908 is disposed above the recess 926. The protrusion portion 924 of the frame 802 is inserted into the recess 926 and abuts against the metal sheet 908 such that the metal sheet 908 is pressed by the protrusion portion 924 after bent, which exerts an elastic restoring force that causes the metal sheet to tightly contact the protrusion portion 924.

According to the present invention, the frame and the housing of the liquid crystal display device can be assembled by coupling the protrusions defined by the T-shaped or L-shaped aperture of the frame to the engaging portion of the housing without any extra fastener such as a screw. Therefore, the frame and the housing can be assembled in an easier way due to eliminating the requirement for aligning the screw thereby saving the cost on buying or manufacturing the external fastening members and the assembling time.

Although the invention has been explained in relation to its preferred embodiment, it is to be understood that many other possible modifications and variations can be made without departing from the spirit and scope of the invention as hereinafter claimed.

What is claimed is:

1. A liquid crystal display devices comprising:
   a liquid crystal panel;
   a housing disposed under the liquid crystal panel, and including a first recess, a second recess, and a protrusion area between the first recess and the second recess, wherein the protrusion area is a trapezoidal area; and
   a frame coupled to the housing and having a display window for accommodating a display region of the liquid crystal panel, the frame including at least one pair of L-shaped apertures defining a first protrusion and a second protrusion,
   wherein the first protrusion is bent into and engaged with the first recess, and the second protrusion is bent into and engaged with the second recess.

2. The liquid crystal display device as claimed in claim 1, wherein the frame is made of metal.

3. The liquid crystal display device as claimed in claim 1, wherein the housing is made of plastics.

4. The liquid crystal display device as claimed in claim 1, wherein each of the first protrusion and the second protrusion has an arm connecting to the frame and a terminal, and wherein the terminal of the first protrusion faces towards the terminal of the second protrusion.

5. The liquid crystal display device as claimed in claim 4, wherein the pair of L-shaped apertures are connected to each other to form a T-shaped aperture.

6. The liquid crystal display device as claimed in claim 1, further comprising a printed circuit board and a ground metal sheet, wherein the printed circuit board is disposed in the housing, and the ground metal sheet has a first terminal portion and a second terminal portion, wherein the first terminal portion contacts with the printed circuit board, and the second terminal portion is disposed above one of the first recess and the second recess and the protrusion area.

7. The liquid crystal display device as claimed in claim 1, wherein the first protrusion has a first hooked terminal and the second protrusion has a second hooked terminal.

8. The liquid crystal display device as claimed in claim 7, wherein the first recess is an arc-shaped recess with a first arc-shaped portion and a second arc-shaped portion coupled with the first arc-shaped portion, and the first hooked terminal is inserted between the first arc-shaped portion and the second arc-shaped portion.

9. The liquid crystal display device as claimed in claim 7, wherein the second recess is an arc-shaped recess with a third arc-shaped portion and a fourth arc-shaped portion coupled with the third arc-shaped portion, and the second hooked terminal is inserted between the third arc-shaped portion and the fourth arc-shaped portion.

10. A liquid crystal display device comprising:
    a liquid crystal panel;
    a housing disposed under the liquid crystal panel, and including a first recess, a second recess, and a protrusion area between the first recess and the second recess;
    a frame coupled to the housing and having a display window for accommodating a display region of the liquid crystal panel, the frame including at least one pair of L-shaped apertures defining a first protrusion and a second protrusion, wherein the first protrusion is bent into and engaged with the first recess, and the second protrusion is bent into and engaged with the second recess; and
    a printed circuit board and a ground metal sheet, wherein the printed circuit board is disposed in the housing, and the ground metal sheet has a first terminal portion and a second terminal portion, wherein the first terminal portion contacts with the printed circuit board, and the second terminal portion is disposed above one of the first recess and the second recess and the protrusion area.

11. The liquid crystal display device as claimed in claim 10, wherein each of the first protrusion and the second protrusion has an arm connecting to the frame and a terminal, and wherein the terminal of the first protrusion faces towards the terminal of the second protrusion.

12. The liquid crystal display device as claimed in claim 11, wherein the pair of L-shaped apertures are connected to each other to form a T-shaped aperture.

13. The liquid crystal display device as claimed in claim 10, wherein the first protrusion has a first hooked terminal and the second protrusion has a second hooked terminal.

14. The liquid crystal display device as claimed in claim 13, wherein the first recess is an arc-shaped recess with a first arc-shaped portion and a second arc-shaped portion coupled with the first arc-shaped portion, and the first hooked terminal is inserted between the first arc-shaped portion and the second arc-shaped portion.

15. The liquid crystal display device as claimed in claim 13, wherein the second recess is an arc-shaped recess with a third arc-shaped portion and a fourth arc-shaped portion coupled with the third arc-shaped portion, and the second hooked terminal is inserted between the third arc-shaped portion and the fourth arc-shaped portion.

16. A liquid crystal display device comprising:
a liquid crystal panel;
a housing disposed under the liquid crystal panel, and including a first recess, a second recess, and a protrusion area between the first recess and the second recess; and
a frame coupled to the housing and having a display window for accommodating a display region of the liquid crystal panel, the frame including at least one pair of L-shaped apertures defining a first protrusion and a second protrusion,
wherein:
the first protrusion is bent into and engaged with the first recess, and the second protrusion is bent into and engaged with the second recess, and
the first protrusion has a first hooked terminal, and the second protrusion has a second hooked terminal.

17. The liquid crystal display device as claimed in claim 16, wherein each of the first protrusion and the second protrusion has an arm connecting to the frame and a terminal, and wherein the terminal of the first protrusion faces towards the terminal of the second protrusion.

18. The liquid crystal display device as claimed in claim 17, wherein the pair of L-shaped apertures are connected to each other to form a T-shaped aperture.

19. The liquid crystal display device as claimed in claim 16, wherein the first recess is an arc-shaped recess with a first arc-shaped portion and a second arc-shaped portion coupled with the first arc-shaped portion, and the first hooked terminal is inserted between the first arc-shaped portion and the second arc-shaped portion.

20. The liquid crystal display device as claimed in claim 16, wherein the second recess is an arc-shaped recess with a third arc-shaped portion and a fourth arc-shaped portion coupled with the third are-shaped portion, and the second hooked terminal is inserted between the third arc-shaped portion and the fourth arc-shaped portion.

* * * * *